United States Patent
Gillespie (10) Patent No.: US 8,645,675 B2
(45) Date of Patent: Feb. 4, 2014

(54) CONFIGURATION OF A BASIC INPUT/OUTPUT SYSTEM (BIOS) BASED ON A SERIES OF FOLLOW UP QUESTIONS TAILORED TO USER TYPE

(75) Inventor: Kurt Gillespie, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 153 days.

(21) Appl. No.: 13/259,819

(22) PCT Filed: Dec. 9, 2009

(86) PCT No.: PCT/US2009/067374
§ 371 (c)(1),
(2), (4) Date: Sep. 23, 2011

(87) PCT Pub. No.: WO2011/071493
PCT Pub. Date: Jun. 16, 2011

(65) Prior Publication Data
US 2012/0017073 A1    Jan. 19, 2012

(51) Int. Cl.
*G06F 15/18* (2006.01)
*G06F 9/445* (2006.01)

(52) U.S. Cl.
USPC .............................................................. 713/2

(58) Field of Classification Search
USPC .............................................................. 713/2
See application file for complete search history.

(56) References Cited

U.S. PATENT DOCUMENTS 5,689,726 A    11/1997    Lin
(Continued)

FOREIGN PATENT DOCUMENTS

KR    20-0204353 Y1    12/2000
KR    10-0475576 B1    3/2005

OTHER PUBLICATIONS

"Single BIOS for Supporting 2 or more Customized BIOS Default Setting," IBM, IPCOM000172125D, The IP.com Journal, Jun. 29, 2008, pp. 1-2, Available at: <priorartdatabase.com/IPCOM/000172125/>.

Alexander Oberneder, "The Art of Flexible BIOS Configuration," Electronics Weekly, May 9, 2008, pp. 1-2, Available at: <electronicsweekly.com/Articles/2008/05/29/43824/the-art-of-flexible-bios-configuration>.

(Continued)

*Primary Examiner* — Chun Cao
*Assistant Examiner* — Danny Chan (57) ABSTRACT

Example embodiments disclosed herein relate to configuring a Basic Input/Output System (BIOS) of a computing device. An embodiment of a method may present, by the computing device, a first request relating to a first functionality of the computing device controlled by one or more settings of the BIOS, and may receive a first user response corresponding to the first request. The method may also present a second request relating to a second functionality of the computing device controlled by one or more settings of the BIOS, with the second request being selected based on the first user response. The method may then receive a second user response corresponding to the second request. In addition, the method may configure at least one setting of the BIOS based on the first and second user responses. Embodiments of a related computing device and computer-readable storage medium are also disclosed.

14 Claims, 6 Drawing Sheets

(56) References Cited

U.S. PATENT DOCUMENTS

| | | | |
|---|---|---|---|
| 5,854,905 A | 12/1998 | Garney | |
| 6,353,885 B1 | 3/2002 | Herzi et al. | |
| 6,356,965 B1 | 3/2002 | Broyles et al. | |
| 6,658,562 B1* | 12/2003 | Bonomo et al. | 713/1 |
| 6,671,802 B1* | 12/2003 | Ott | 713/100 |
| 7,039,799 B2 | 5/2006 | Smith et al. | |
| 7,600,105 B2 | 10/2009 | Tseng | |
| 2002/0087966 A1* | 7/2002 | Wiginton et al. | 717/174 |
| 2005/0182945 A1* | 8/2005 | Ali et al. | 713/182 |
| 2005/0251786 A1* | 11/2005 | Citron et al. | 717/106 |
| 2006/0123220 A1 | 6/2006 | Colson | |
| 2006/0139312 A1* | 6/2006 | Sinclair et al. | 345/156 |
| 2007/0028229 A1* | 2/2007 | Knatcher | 717/174 |
| 2008/0155534 A1* | 6/2008 | Boss et al. | 717/178 |
| 2010/0180221 A1* | 7/2010 | Cloward et al. | 715/764 |
| 2011/0029766 A1* | 2/2011 | Sever et al. | 713/2 |

OTHER PUBLICATIONS

HP Client Manager 6.1 White Paper, Published May 31, 2006, Available at: <symantec.com/connect/articles/hp-client-manager-61-white-paper>.

Kurt David Gillespie, Notification of Transmittal of the International Search Report and the Written Opinion of the International Searching Authority, or the Declaration, Date of Mailing: Aug. 30, 2010, International Application No. PCT/US2009/067374 filed Dec. 9, 2009, 9 pages.

International Preliminary Report on Patentability, International Application No. PCT/US2009/067374, Date of Mailing: Jun. 21, 2012, pp. 1-6.

* cited by examiner

CONFIGURATION OF A BASIC INPUT/OUTPUT SYSTEM (BIOS) BASED ON A SERIES OF FOLLOW UP QUESTIONS TAILORED TO USER TYPE

CROSS-REFERENCE TO RELATED APPLICATION

This application is a national stage application under 35 U.S.C. §371 of PCT/US2009/067374, filed Dec. 9, 2009.

BACKGROUND

Personal computers (PCs) and many other computing devices include a Basic Input/Output System (BIOS), which is used to configure hardware and load the operating system (OS) upon power-up of the device. More specifically, upon power-up, a processor loads and executes the BIOS instructions to identify, test, and initialize hardware installed in the device. By initializing the hard disk, system memory, video card, network devices, and the like, the BIOS prepares the device to load and execute the operating system. The user may, in turn, interact with the operating system to execute applications.

In addition to enabling basic operation of the device, the BIOS also allows for low-level user customization and control of the hardware. In particular, a typical BIOS includes a graphical user interface, which allows the user to tweak hardware settings. For example, the user may modify the boot sequence, configure drives, and configure power management settings.

Unfortunately, to the average user, the options presented in the BIOS user interface are intimidating and difficult to understand. Furthermore, even users with substantial knowledge may be reluctant to modify settings of the BIOS for fear of rendering the device inoperable. Thus, the ability to tweak the BIOS settings has traditionally been limited to all but the most technically-savvy users.

BRIEF DESCRIPTION OF THE DRAWINGS

In the accompanying drawings, like numerals refer to like components or blocks. The following detailed description references the drawings, wherein.

DETAILED DESCRIPTION

As described above, a typical computer user lacks the knowledge and experience necessary to modify the settings of the BIOS to meet his or her preferences. Accordingly, as described in detail below, various example embodiments relate to a guided process that enables a user to quickly configure the BIOS without requiring detailed knowledge of the underlying BIOS settings. In particular, in some embodiments, the user may simply respond to a number of requests related to functionality of the computing device, and the process may then configure the BIOS settings based on the responses from the user. In addition, in some embodiments, the requests presented are selected based on previous responses, such that unnecessary or redundant requests are avoided. In this manner, a user may, for example, quickly optimize the boot time of the computing device without requiring knowledge of each BIOS setting that is modified. Additional embodiments and applications will be apparent to those of skill in the art upon reading and understanding the following description.

Figure 1:
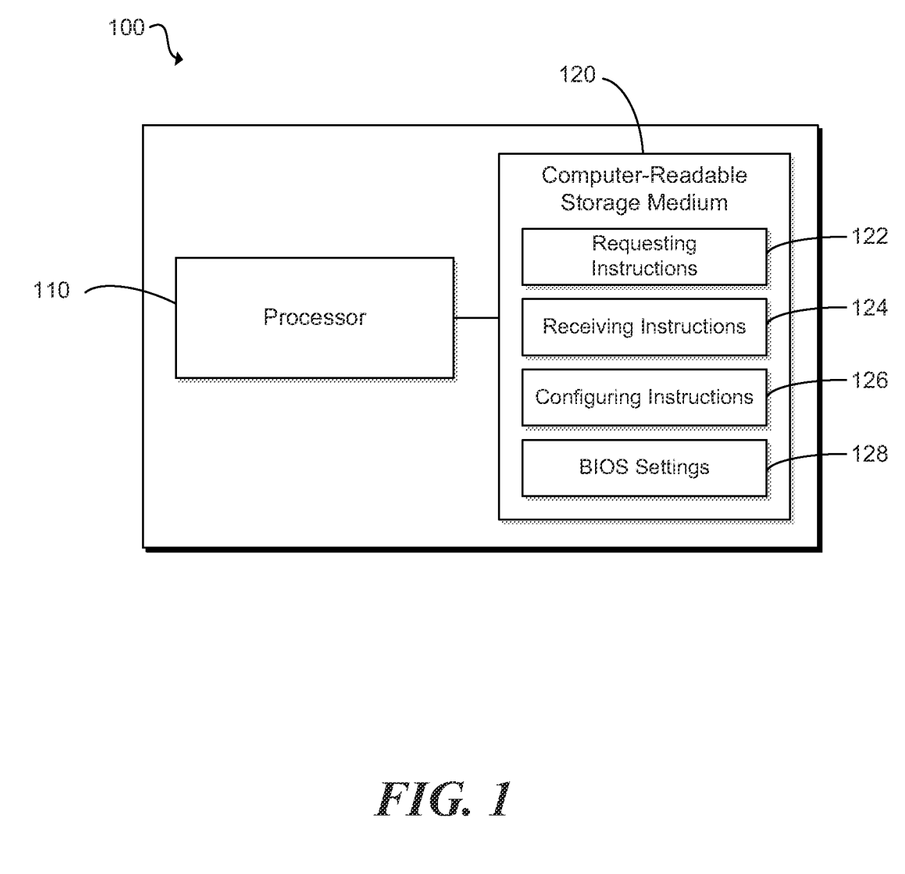
FIG. 1 is a block diagram of an embodiment of a computing device including a computer-readable storage medium encoded with instructions for configuring a BIOS.

Referring now to the drawings, FIG. 1 is a block diagram of an embodiment of a computing device 100 including a computer-readable storage medium 120 encoded with instructions for configuring a BIOS. Computing device 100 may be, for example, a desktop computer, a laptop computer, a server, a handheld computing device, or the like. In the embodiment of FIG. 1, computing device 100 includes a processor 110 and a computer-readable storage medium 120.

Processor 110 may be a central processing unit (CPU), a semiconductor-based microprocessor, or any other hardware device suitable for retrieval and execution of instructions stored in computer-readable storage medium 120. In particular, processor 110 may fetch, decode, and execute requesting instructions 122, receiving instructions 124, and configuring instructions 126 to implement the BIOS configuration functionality described in detail below.

Computer-readable storage medium 120 may be an electronic, magnetic, optical, or other physical device that contains or stores executable instructions. In some embodiments, computer-readable storage medium 120 is a non-volatile memory device that stores the BIOS. Thus, in these embodiments, instructions 122, 124, 126 and BIOS settings 128 are stored on the same computer-readable storage medium 120 as the BIOS. Alternatively, computer-readable storage medium 120 may be storage independent of the BIOS, such that instructions 122, 124, 126 are executable from a hard disk drive, flash memory, random access memory, or the like.

Regardless of the particular implementation, computer-readable storage medium 120 may include BIOS configuration instructions used to configure the BIOS based on interaction with the user. Requesting instructions 122 may comprise a group of instructions that visually and/or auditorily present a number of requests for information to the user relating to functionality of computing device 100 controlled by settings of the BIOS. Requesting instructions 122 may, for example, retrieve the requests from a database or other data structure on computer-readable storage medium 120 or another computer-readable storage medium. Alternatively, requesting instructions 122 may be coded to include the requests to be presented. Requesting instructions 122 may then trigger output of the requests to the user.

In some embodiments, each request may relate to one or more hardware functions of computing device 100 and be designed to ascertain the user's preferences regarding a particular function (e.g., whether the user requires the use of the particular hardware function). For example, a request could be presented to determine a desired boot order, whether the user desires the ability to boot from external devices, whether the user desires network access, whether the user desires advanced security features, etc.

In order to determine the user's preferences for a particular function of the computing device, requesting instructions 122 may present a question to the user. It should be apparent, however, that the request need not be in the form of a question. Requesting instructions 122 may instead, for example, present a list of functions and request that the user specify his or her preferences (e.g., the required and/or non-required functions). As another option, requesting instructions 122 may present a true or false statement regarding the user's preferences for computing device 100 and request that the user either agree or disagree with the statement. Other suitable requests will be apparent to those of skill in the art.

In addition, in some embodiments, requesting instructions 122 may select the request to present based on a user's response to one or more previous requests. For example, requesting instructions 122 may select from a plurality of candidate requests, each request corresponding to one or more possible responses to the previous request.

For example, requesting instructions 122 may determine, from the previous request, whether more specific questions regarding a particular functionality are required. As one specific example, suppose that a first request relates to whether a user will boot an operating system from an external drive. If the response from the user indicates that the user will not boot from an external drive, requesting instructions 122 need not present more specific questions regarding external booting, as it may be determined that all external booting functions may be disabled. Alternatively, should the user indicate that he or she may boot from an external drive, requesting instructions 122 may present more specific questions to determine which type of external drives (e.g., Universal Serial Bus, Secure Digital, etc.) the user may attach to boot the operating system.

In this manner, requesting instructions 122 may avoid the need to present unnecessary questions and quickly determine the appropriate BIOS settings for the user. In some embodiments, requesting instructions 122 may select a subsequent request by traversing a decision tree or other data structure using the previous response. An example of a decision tree is described in further detail below in connection with FIG. 5. Regardless of the method used, after selection of the request, requesting instructions 122 may present the request to the user.

Receiving instructions 124 may receive a response from the user in response to each request presented by requesting instructions 122. In particular, receiving instructions 124 may receive input from the user indicating the user's preferences regarding a particular function of computing device 100. For example, receiving instructions 124 may monitor an input controller to detect entry of a response from the user via a keyboard, mouse, or other input device. An example of the interaction between the user and receiving instructions 124 is detailed below in connection with FIG. 2.

Configuring instructions 126 may configure at least one setting of BIOS settings 128 based on the information provided by the user to receiving instructions 124. In particular, configuring instructions 126 may determine the functionality preferences of the user based on the responses, and then modify or update BIOS settings 128 to meet those preferences. As one example, configuring instructions 126 may access a mapping in a table or other data structure in computer-readable storage medium 120 to determine which changes to the BIOS settings are required based on the user's responses. Alternatively, the appropriate BIOS settings may be coded into configuring instructions 126, such that the appropriate settings are determined based on one or more branching instructions. Regardless, after determining the appropriate settings, configuring instructions 126 may modify or update BIOS settings 128, if necessary, to reflect any changes needed to meet the user's preferences for the functionality of the computing device. As an example, configuring instructions 126 may modify BIOS settings 128 to enable required functionality or disable non-required functionality. The modified or updated settings 128 will then be applied upon re-boot of computing device 100.

BIOS settings 128 may comprise one or more data structures used to maintain the current configuration settings of the BIOS. Thus, BIOS settings 128 may include a number of values indicating a particular component of computing device 100 and whether that component is enabled or disabled. In addition, BIOS settings 128 may include a list of values indicating an order or priority of components, such as the boot order of storage devices. Other settings maintained in BIOS settings 128 will be apparent to those of skill in the art.

In embodiments, where computer-readable storage medium 120 stores the BIOS, BIOS settings 128 may be maintained on the same storage medium. Alternatively, when computer-readable medium 120 is storage independent from the BIOS, BIOS settings 128 may be maintained in a non-volatile memory associated with the BIOS or on computer-readable medium 120. It should be apparent that BIOS settings 128 may be located in any storage medium, provided that they are accessible to the BIOS upon power-up of computing device 100.

Thus, in some embodiments, processor 110 may execute requesting instructions 122 to request a user to specify preferences regarding functions of computing device 100 controlled by the BIOS settings 128. Processor 110 may then execute receiving instructions 124 to receive the user's response and select an additional request based on the response. After receiving a response to each of the requests or after receipt of each individual response, processor 110 may execute configuring instructions 126 to modify or update BIOS settings 128 based on the user's responses.

Figure 2:
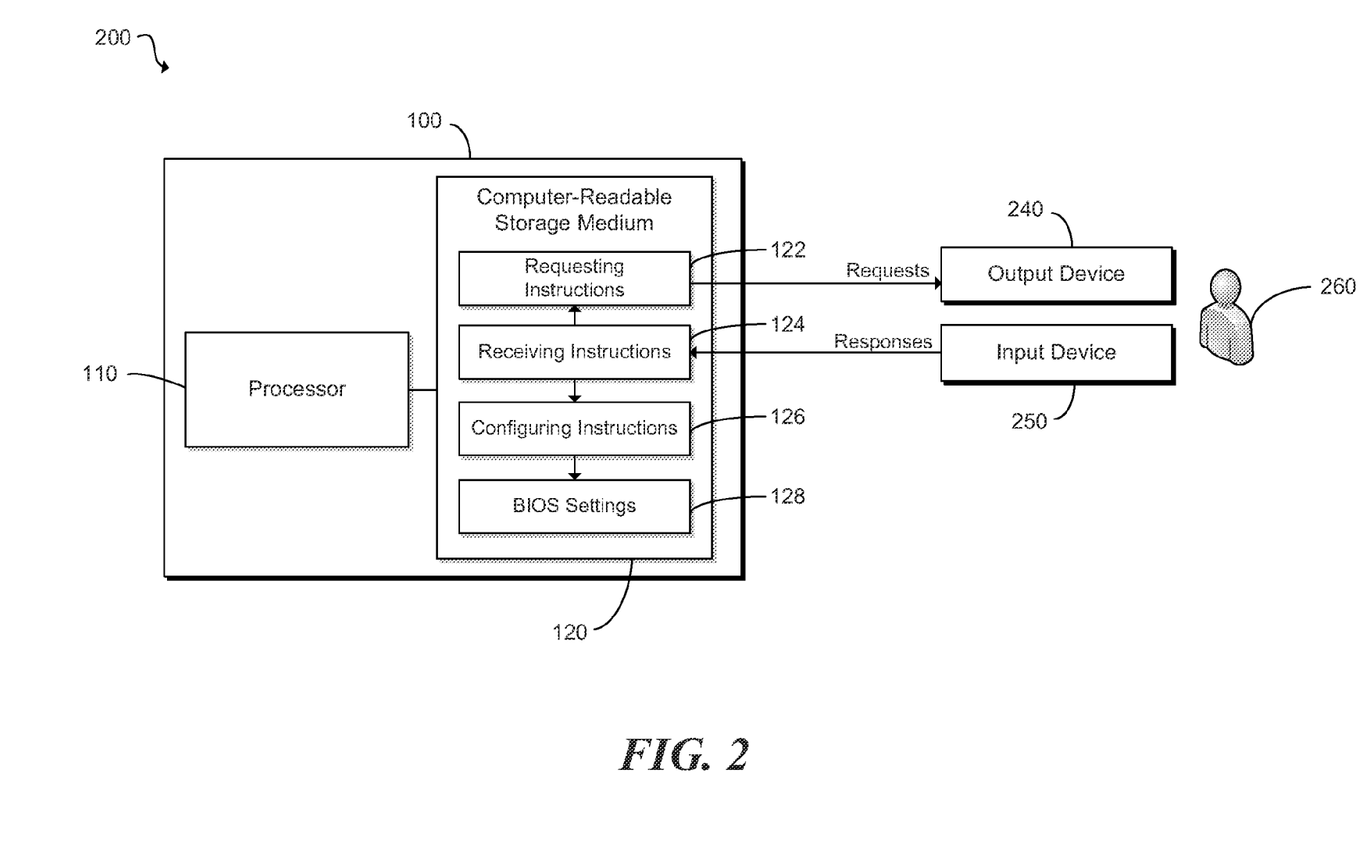
FIG. 2 is a block diagram of an embodiment of a computing device and an example of an interaction with a user for configuring a BIOS.

FIG. 2 is a block diagram 200 of an embodiment of a computing device 100 and an example of an interaction with a user 260 for configuring a BIOS. As illustrated, computing device 100 may be implemented according to an embodiment described above in connection with FIG. 1. User 260 may interact with computing device 100 using output device 240 and input device 250 to configure the settings of the BIOS.

In particular, output device 240 may include a display device, such as a monitor, and/or an audio device, such as one or more speakers. It should be apparent, however, that any suitable display and/or audio devices may be used, provided that the requests are communicated to user 260. Output device 240 may be internal or external to computing device 100 depending on the configuration of computing device 100.

Input device 250 may include a mouse, a keyboard, a touchpad, and/or a microphone. It should be apparent, however, that any suitable input device may be used, provided that user 260 may communicate the responses to computing device 100. Input device 250 may be internal or external to computing device 100 depending on the configuration of computing device 100.

In operation, processor 110 may execute requesting instructions 122 to present a plurality of requests, each relating to a function of computing device 100 controlled by one or more of BIOS settings 128. In particular, processor 110 may initiate output of each request to output device 240 of user 260. As described above, in some embodiments, the request to be presented is determined using a response to the previous request. User 260 may then interact with input device 250 to specify his or her preferences regarding the particular function of computing device 100. Input device 250 may then communicate each response to processor 110 and, more specifically, receiving instructions 124. Finally, processor 110 may execute configuring instructions 126 to modify or update BIOS settings 128 based on the user's responses.

Figure 3:
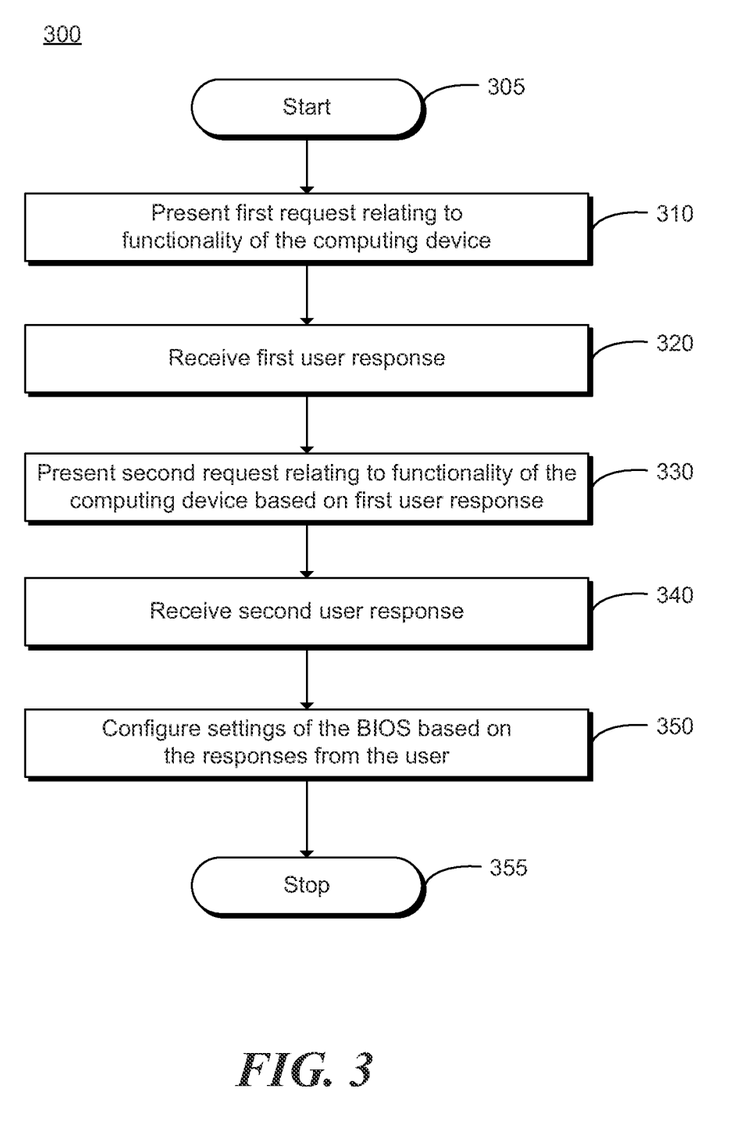
FIG. 3 is flowchart of an example of a method for configuring a BIOS of a computing device.

FIG. 3 is flowchart of an example of a method 300 for configuring a BIOS of a computing device. Execution of method 300 is described below with reference to the components of computing device 100. Other suitable components for execution of method 300 will be apparent to those of skill in the art. Method 300 may be implemented in the form of executable-instructions stored on a computer-readable storage medium.

Method 300 may start in block 305 and proceed to block 310, where processor 110 may execute requesting instructions 122 to present a first request to a user to specify a preference regarding a first functionality of computing device 100 controlled by one or more of BIOS settings 128. Method 300 then proceeds to block 320, where processor 110 may execute receiving instructions 124 to receive the user's response.

After receiving the first user response, method 300 proceeds to block 330, where processor 110 may execute requesting instructions 122 to select a second request related to a second functionality based on the first user response, and then present the second request to the user. As an example, requesting instructions 122 may select from two or more requests, each request corresponding to one or more possible responses to the previous request.

Method 300 then proceeds to block 340, where processor 110 may execute receiving instructions 124 to receive the second user response. Finally, method 300 proceeds to block 350, where processor 110 may execute configuring instructions 126 to modify or update BIOS settings 128 based on the user's responses. Method 300 then proceeds to block 355, where method 300 stops.

It should be noted that, although method 300 is illustrated as presenting only two requests, any number of requests may be presented. In such embodiments, method 300 may repeat blocks 330 and 340 until the appropriate number of requests has been presented. Furthermore, the first and second functionalities may be related or unrelated. As an example of related functionalities, the first request could relate to a general functionality (e.g., whether a custom boot order is desired), while the second request could relate to specifics of that functionality (e.g., which device should be first in the boot order). As an example of unrelated functionalities, the first request could relate to hard drive encryption, while the second request could relate to overclocking of the processor.

Figure 4A:
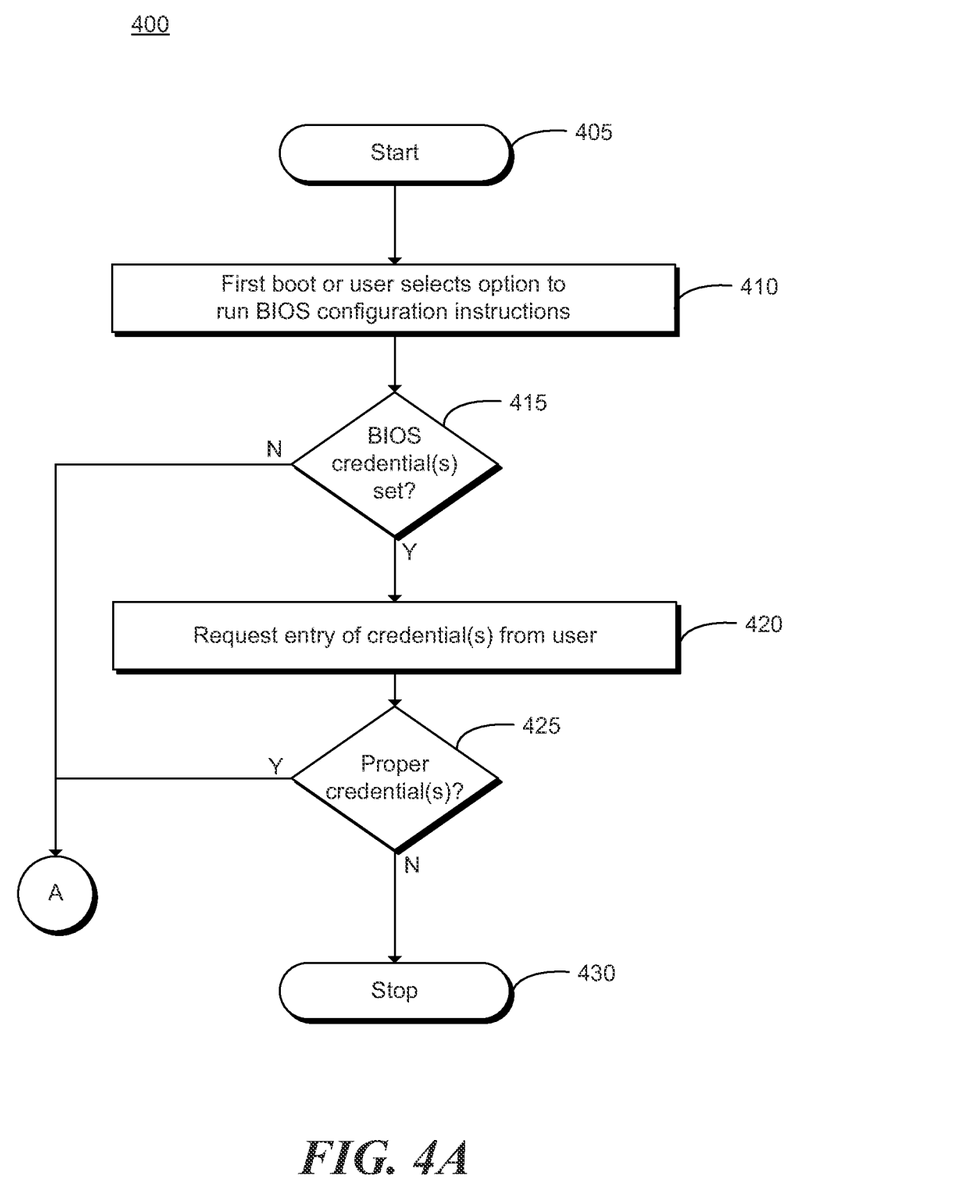
FIGS. 4A and 4B are flowcharts of an example of a method for configuring a BIOS of a computing device.
Figure 4B:
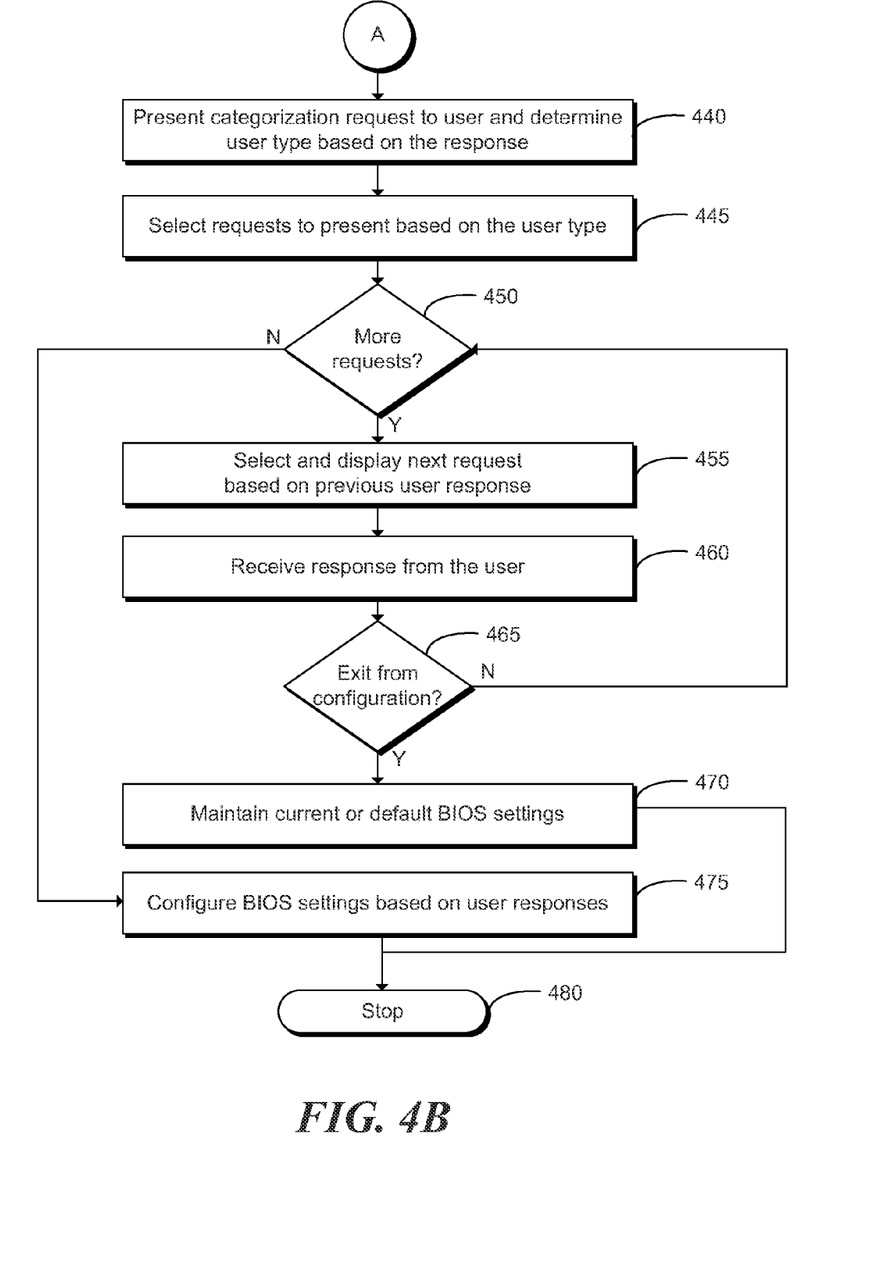

FIGS. 4A and 4B are flowcharts of an example of a method 400 for configuring a BIOS of a computing device. Execution of method 400 is described below with reference to the components of computing device 100. Other suitable components for execution of method 400 will be apparent to those of skill in the art. Method 400 may be implemented in the form of executable-instructions stored on a computer-readable storage medium.

Method 400 may start in block 405 and proceed to block 410. In block 410, processor 110 may determine that computing device 100 has been booted for the first time and therefore determine that the BIOS configuration instructions should be executed. Alternatively, processor 110 may determine that the user has selected an option to run the BIOS configuration instructions. For example, the user interface of the BIOS may display an option that, when selected by the user, triggers execution of the BIOS configuration instructions. This user interface may be displayed in the BIOS setup menu or, alternatively, upon entry of one or more designated keys during a boot-up sequence.

After determining that the BIOS configuration instructions should be executed, method 400 proceeds to block 415, where processor 110 may determine whether one or more BIOS credentials have been set. The BIOS credentials may include a password, a digital key stored on an external device, a biometric (e.g., fingerprint, retinal scan), and the like. When it is determined that the BIOS credentials have not yet been set, method 400 proceeds to execution of the BIOS configuration instructions, described in further detail below in connection with FIG. 4B.

Alternatively, when it is determined that the BIOS credentials have been set, method 400 proceeds to block 420, where processor 110 may initiate a request to the user to provide the credentials. Upon receipt of a response from the user, method 400 proceeds to block 425, where processor 110 may verify the credentials provided by the user. When the credentials provided by the user match the stored credentials, processor 110 may determine that the user is authorized to run the BIOS configuration instructions. Method 400 may therefore proceed to execution of the BIOS configuration instructions, described in further detail below in connection with FIG. 43. Alternatively, when the credentials provided by the user are not proper, processor 110 may determine that the user is not authorized to run the BIOS configuration instructions. Method 400 may therefore proceed to block 430, where method 400 stops.

Referring now to FIG. 4B, when the BIOS credentials have not yet been set or the user is properly authorized, method 400 proceeds to block 440. In block 440, processor 110 may initiate presentation of a categorization request to the user. In particular, processor 110 may initiate presentation of a request for details regarding the type of user. For example, processor 110 may trigger display of a number of categories from which the user may specify his or her user type (e.g., power user, home user, small business user, etc.). As another example, processor 110 may gather information from the user regarding the primary uses of computing device 100, then determine the user type based on the responses from the user. For example, if the user indicates that the primary uses are browsing the Internet and playing multimedia, processor 110 may determine that the user is a home user. In contrast, if the user indicates that the primary uses are word processing and email, processor 110 may determine that the user is a business user.

After presenting the categorization request to the user, receiving a response from the user, and determining the user type, method 400 proceeds to block 445. In block 445, processor 110 may select a group of requests to present to the user based on the user type. In some embodiments, each user type is associated with a group of requests corresponding to that user type. In particular, a group of requests presented to the user may relate to different functionalities depending on the user type. As an example, it may be assumed that a business user will always require networking functionality and therefore omit network-related requests for the business user. As another example, the requests for a power user may be more specific than those presented to a basic home user, as it may not be possible to infer a particular group of settings given a basic user's inability to respond to highly technical questions. As a result, the level of customization for a power user may be of a finer granularity than that of a basic home user.

In addition to presenting different groups of requests depending on the user type, at least one of the requests may have multiple versions with different wordings customized for the particular user type. Thus, the requests related to a particular functionality may use a different wording depending on, for example, the typical knowledge of that user type. For example, requests for power users may use technical terminology (e.g., "Universal Serial Bus (USB)," "Disk Operating System (DOS)," etc.), while requests for basic home users may avoid the use of such terms. Further examples of customization of requests are presented in detail below in connection with FIG. 5.

It should be apparent that, although method 400 is illustrated as selecting an entire group of requests in block 445 prior to presenting any requests, that this block need not be performed first. Instead, processor 110 may select the appropriate request at the time the particular request is to be presented.

After selecting the group of requests, method 400 proceeds to block 450, where processor 110 may determine whether there are additional requests to be presented to the user. When there are no more requests to be presented, method 400 proceeds to block 475, described in further detail below. Alternatively, when there are additional requests, method 400 proceeds to block 455.

In block 455, processor 110 may select the next request from the group. In some embodiments, processor 110 selects the next request based on a previous response from the user. Thus, for the first request, processor 110 may select a designated initial request or, alternatively, select the first request based on the user's response to the categorization request. For subsequent requests, processor 110 may select the request based on the user's response to one or more previous requests (e.g., the immediately preceding request). After selecting the next request, processor 110 may then initiate display of the request to the user. For example, processor 110 may initiate display of the request to an output device 240 accessible to the user.

Method 400 then proceeds to block 460, where processor 110 may receive a response from the user through, for example, an input device 250 accessible to the user. The response from the user may indicate the user's preferences regarding the functionality controlled by one or more settings of the BIOS.

After receipt of the response from the user, method 400 proceeds to block 465, where processor 110 may analyze the response and determine whether the user wishes to exit from the configuration process. As an example, by entering a particular response, the user may indicate that he or she does not understand the request or that he or she does not know whether a particular functionality is required. As another example, the user may enter a predetermined key, key combination, or key sequence indicating that the user wishes to exit from the process.

When the user's response does not indicate that the user wishes to exit the process, processor 110 may initiate storage of the response (e.g., in Random Access Memory or on a hard disk). Method 400 then returns to block 450. Alternatively, when the user's response indicates that the user wishes to exit the process, method 400 proceeds to block 470. In block 470, processor 110 may maintain a current or default setting for the one or more settings of the BIOS that control the functionality referenced by the one or more requests. It should be apparent that, in some instances, method 400 may modify some settings, while maintaining the current or default setting for others. Method 400 may then proceed to block 480, where method 400 stops.

As detailed above, when it is determined in block 450 that there are no more requests to be presented, method 400 proceeds to block 475. In block 475, processor 110 may configure the BIOS settings based on the responses from the user in a manner that meet the user's preferences. Processor 110 may modify configuration of the processor, memory, storage, power management, boot devices, or any other configurable settings of the BIOS.

As one example, processor 110 may configure the BIOS settings in a manner that enables a minimum number of BIOS settings, while still providing all functionality required by the user. Thus, in such embodiments, processor 110 may disable one or more settings of the BIOS that control a functionality not required by the user. In this manner, processor 110 may configure the BIOS in a manner that minimizes boot time of computing device 100, while still meeting the user's preferences.

As another example, processor 110 may selectively enable features indicated as required by the user, but not currently enabled in the BIOS. Other suitable modifications to the BIOS settings will be apparent to those of skill in the art. After configuring the BIOS settings based on the user's responses, method 400 proceeds to block 480, where method 400 stops.

Figure 5:
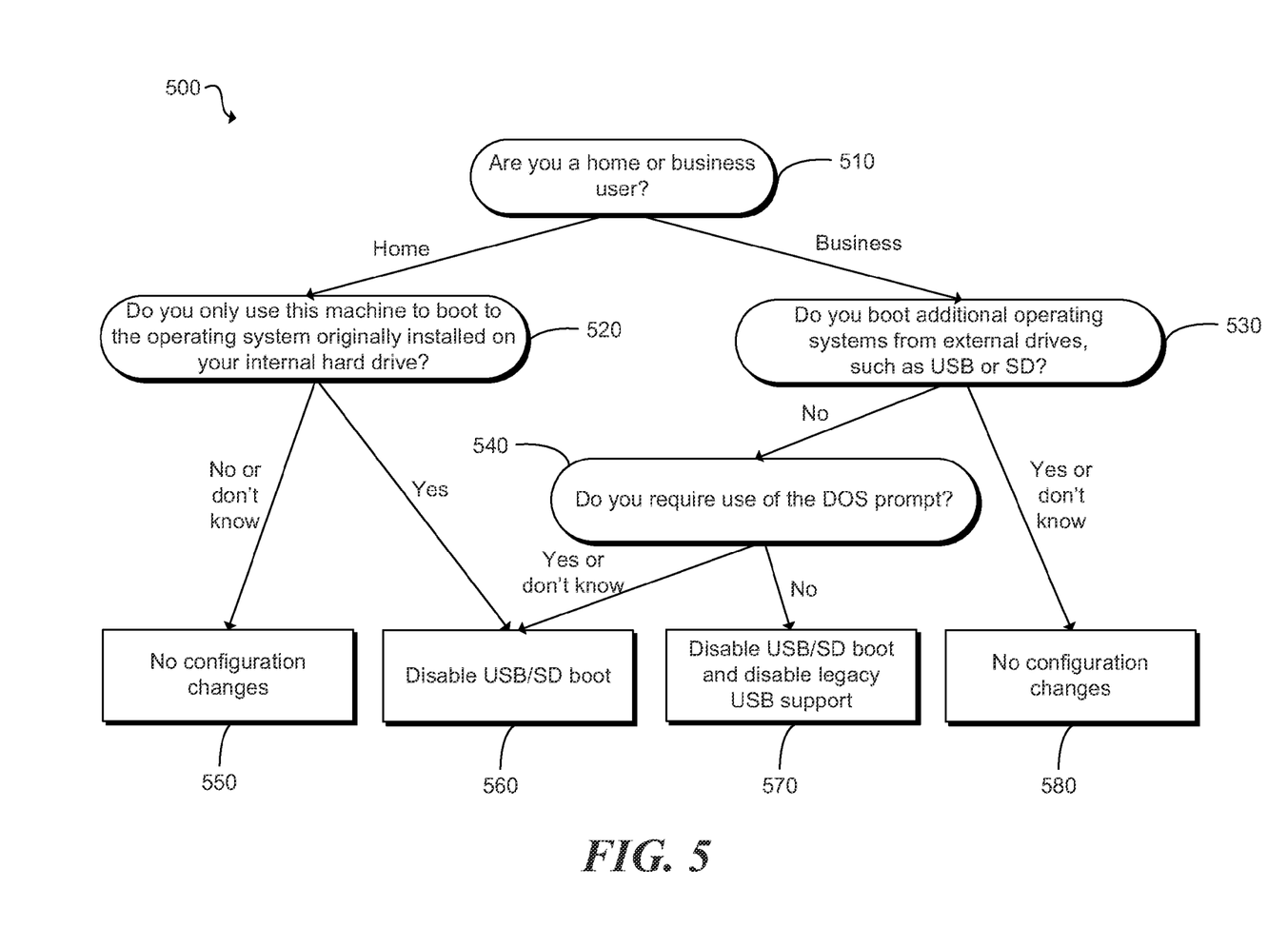
FIG. 5 is a schematic diagram of an embodiment of a decision tree used in configuring a BIOS of a computing device.

FIG. 5 is a schematic diagram of an embodiment of a decision tree 500 used in configuring settings of a BIOS of a computing device 100. Decision tree 500 may represent an abstraction of the process for selecting requests and configuring the settings of the BIOS based on a user's responses. Thus, decision tree 500 or another tree configured with different requests may be used in conjunction with the BIOS configuration instructions and methods described in further detail above. In particular, some embodiments may determine appropriate requests and configuration settings by traversing a decision tree using the user responses. The requests of decision tree 500 may be maintained in a tree-based data structure. Other suitable data structures for storing decision tree 500 will be apparent to those of skill in the art.

As illustrated in node 510, tree 500 first determines whether the user is a home or business user. When the user indicates that he or she is a home user, tree 500 branches to node 520. Alternatively, when the user indicates that he or she is a business user, tree 500 branches to node 530.

In node 520, tree 500 determines whether the user will only use the computing device to boot to the operating system originally installed on the internal hard drive. When the user indicates that he or she will boot to different operating systems or that he or she does not know, tree 500 branches to leaf node 550 and the current or default settings of the BIOS are maintained.

Alternatively, when the user indicates that he or she will only boot to the operating system originally installed, tree 500 branches to leaf node 560. In leaf node 560, the settings of the BIOS are modified such that USB boot and Secure Digital (SD) boot are disabled. It should be noted that the request of node 520 that leads to leaf node 560 does not mention either USB or SD, as such terms are likely to be unknown to a home user. Nevertheless, the response from the user is sufficient to determine that these features are not required. Accordingly, requests may be worded in a manner such that the settings of the BIOS may be configured without explicitly identifying the underlying settings of the BIOS in the request.

As detailed above, when tree 500 determines that the user is a business user, tree 500 branches to node 530. In node 530, tree 500 determines whether the user will boot additional operating systems from external drives, such as USB or SD. It should be noted that, in contrast to a home user, tree 500 assumes that a typical business user would be familiar with the terms USB and SD. Thus, although the requests in nodes 520 and 530 are related to the same functionality, the wording of the requests may be customized based on, for example, the typical knowledge of a particular type of user. When the user indicates that he or she will boot to external drives or that he or she does not know, tree 500 branches to leaf node 580, where the current or default settings of the BIOS are maintained.

Alternatively, when the user indicates that he or she will not boot to external drives, decision tree 500 branches to node 540. In node 540, tree 500 determines whether the user will require use of the DOS prompt. When the user will require the DOS prompt or does not know whether the DOS prompt is required, tree 500 branches to leaf node 560, where only USB and SD boot are disabled. Alternatively, when the user will not require use of the DOS prompt, tree 500 branches to leaf node 570, where USB and SD boot are disabled and, in addition, legacy USB support is disabled. In this manner, as illustrated, requests may be presented in increasing order of specificity. As a result, tree 500 may progressively narrow down the required set of functionality, such that the BIOS settings may be optimized for the particular user, without unnecessarily presenting additional questions to the user.

Other suitable BIOS settings for modification by decision tree 500 will be apparent to those of skill in the art. For example, in addition to disabling legacy USB support and external booting, tree 500 may also disable automatic detection of USB devices. As another example, tree 500 may include a request to determine the user's need for hardware security features and, based on the user's response, selectively enable or disable theft deterrence features of the BIOS, a trusted platform module (TPM) in the computing device, and/or hard drive encryption. As yet another example, tree 500 may include a request to determine whether the user requires network access and, when network access is not required, could disable any network adapters included in the computing device. Finally, as another example, tree 500 could determine whether the user requires display of video upon boot-up (e.g., an Original Equipment Manufacturer logo or test details) and disable such display if it is not required.

According to the embodiments described in detail above, a user may easily alter the settings of the BIOS based on his or her preferences for the computing device. By simply responding to the requests presented, any user of the device may decrease boot time, improve performance, disable unnecessary features, or even enable features of which the user was unaware. In this manner, even novice users of a computing device may quickly modify the BIOS settings without manually navigating the BIOS menu or understanding the function of each setting. Such a process results in an improved user quality of experience and increased product satisfaction.

I claim:

1. A method for configuring a Basic Input/Output System (BIOS) of a computing device, the method comprising:
   presenting, by the computing device, a first request relating to a first computing device functionality controlled by one or more settings of the BIOS;
   receiving, by the computing device, a first user response corresponding to the first request;
   presenting, by the computing device, a second request relating to a second computing device functionality controlled by one or more settings of the BIOS, wherein the second request is selected based on the first user response;
   receiving, by the computing device, a second user response corresponding to the second request;
   determining a user type from a plurality of user types, wherein the first and second requests each have multiple versions, each version using wording customized for a respective user type, and the first and second requests presented by the computing device are selected from the multiple versions based on the determined user type; and
   configuring, by the computing device, at least one setting of the BIOS based on the first and second user responses.

2. The method of claim 1, wherein the second request is selected from a plurality of candidate requests, each candidate request corresponding to a respective possible response to the first request.

3. The method of claim 2, wherein the second request is selected from the plurality of candidate requests by using the first user response to traverse a decision tree from a first node corresponding to the first request to a second node corresponding to the second request.

4. The method of claim 1, wherein:
   the first user response indicates a user requirement for the first computing device functionality and the second user response indicates a user requirement for the second computing device functionality, and
   the configuring comprises:
      when the first user response indicates that the first computing device functionality is not required, disabling the one or more settings of the BIOS that control the first computing device functionality, and
      when the second user response indicates that the second computing device functionality is not required, disabling the one or more settings of the BIOS that control the second computing device functionality.

5. The method of claim 1, further comprising:
   presenting a categorization request;
   wherein determining the user type from the plurality of user types is based on a user response to the categorization request.

6. The method of claim 1, wherein the plurality of user types are associated with respective groups of requests, the method further comprising:
   selecting one of the groups based on the determined user type,
   the first and second requests presented by the computing device being selected from the selected group of requests.

7. The method of claim 1, wherein the method executes during a boot-up procedure of the computing device.

8. A computing device comprising:
   a processor;
   a computer-readable storage medium encoded with BIOS configuration instructions executable by the processor, the BIOS configuration instructions comprising:
      instructions for presenting a plurality of requests, each request relating to a respective functionality controlled by one or more settings of a Basic Input Output System (BIOS),
      instructions for receiving a plurality of responses from a user, each response corresponding to a respective one of the requests, wherein each request subsequent to a first of the requests is selected based on the response to a previous one of the requests,
      instructions for determining a user type from a plurality of user types, wherein the requests each have multiple versions, each version using wording customized for a respective user type, and the requests presented are selected from the multiple versions based on the determined user type, and
      instructions for configuring at least one setting of the BIOS based on the plurality of responses.

9. The computing device of claim 8, wherein, when the response corresponding to a particular one of the requests indicates that the user does not understand the particular request or know an appropriate response to the particular request, the instructions for configuring maintain a default or current setting for the at least one setting of the BIOS that controls the related functionality.

10. The computing device of claim 8, wherein at least one of the plurality of requests does not explicitly identify the one or more settings of the BIOS that control the respective functionality.

11. The computing device of claim 8, wherein the computer-readable storage medium further comprises:
instructions for automatically beginning execution of the BIOS configuration instructions during boot-up when a credential used to access the BIOS has not yet been set.

12. A non-transitory computer-readable storage medium encoded with instructions executable by a computing device to configure a Basic Input/Output System (BIOS), the instructions comprising:
instructions for presenting a plurality of requests, each request relating to a respective functionality controlled by one or more settings of the BIOS;
instructions for receiving, from a user, a plurality of responses, each response corresponding to a respective one of the requests;
instructions for determining a user type from a plurality of user types, wherein the requests each have multiple versions, each version using wording customized for a respective user type, and the requests presented are selected from the multiple versions based on the determined user type, and
instructions for configuring at least one setting of the BIOS to meet the user preferences based on the plurality of responses,
wherein each request subsequent to a first of the requests is selected from a plurality of candidate requests using a response to a previous one of the requests, each candidate request corresponding to a possible response to the previous request.

13. The computer-readable storage medium of claim 12, wherein each subsequent request is selected from the plurality of candidate requests by traversing a decision tree using the response to the previous request.

14. The computer-readable storage medium of claim 13, wherein the instructions for configuring configure the at least one setting of the BIOS based on configuration information associated with a leaf node of the decision tree reached using a last response from the user.

\* \* \* \* \*